US006421526B1

United States Patent
Banno

(10) Patent No.: US 6,421,526 B1
(45) Date of Patent: Jul. 16, 2002

(54) BEAM AUTOMATIC SELECTION SWITCHING METHOD IN MULTI-BEAM SATELLITE COMMUNICATION SYSTEM AND APPARATUS FOR SAME

(75) Inventor: Kozo Banno, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 823 days.

(21) Appl. No.: 08/703,907

(22) Filed: Aug. 27, 1996

(30) Foreign Application Priority Data

Feb. 6, 1996 (JP) ............................................. 8-020304

(51) Int. Cl.[7] ............................................. H04B 7/185
(52) U.S. Cl. ..................... 455/13.1; 455/13.3; 455/12.1
(58) Field of Search ............................ 455/427, 425, 455/428, 429, 430, 12.1, 13.1, 507, 517, 524, 456, 457, 436, 440

(56) References Cited

U.S. PATENT DOCUMENTS

| 5,119,504 A | * | 6/1992 | Durboraw, III | 455/54.1 |
| 5,463,400 A | * | 10/1995 | Tayloe | 342/352 |
| 5,483,664 A | * | 1/1996 | Moritz et al. | 455/13.1 |
| 5,528,247 A | * | 6/1996 | Nonami | 342/357 |
| 5,552,795 A | * | 9/1996 | Tayloe et al. | 342/357 |
| 5,604,920 A | * | 2/1997 | Bertiger et al. | 455/13.1 |

FOREIGN PATENT DOCUMENTS

JP   2-171039   7/1990

* cited by examiner

*Primary Examiner*—Daniel Hunter
(74) *Attorney, Agent, or Firm*—Rothwell, Figg, Ernst & Manbeck

(57) ABSTRACT

A position-beam correspondence data table in which a plurality of areas on the ground and beams from the communication satellite each covering each area are correlated to each other is previously prepared, a current position of the mobile satellite communication terminal is computed by a position computing means at a point of time when the mobile satellite communication terminal is not executing communications such as when a power for the mobile satellite communication terminal is turned ON, or when a prespecified key is pressed down, a beam corresponding to the computed current position is red out from said position-beam correspondence data table, a beam to be used in the area including the current position is decided, and a beam switch request command for switching to this beam is transmitted to the communication satellite.

20 Claims, 5 Drawing Sheets

| LONGITUDE M ╲ LATITUDE ℓ | 50° ≤ m < 55° | 55° ≤ m < 60° | 60° ≤ m < 65° | 65° ≤ m < 70° |
|---|---|---|---|---|
| 40° ≤ ℓ < 45° | B | A | A | D |
| 45° ≤ ℓ < 50° | B | A | A | D |
| 50° ≤ ℓ < 55° | — | C | C | — |
| 55° ≤ ℓ < 60° | — | C | C | — |

FIG. 4

| MOVING DIRECTION d | 0°≤d<45° | 45°≤d<90° | 90°≤d<135° | 135°≤d<180° | 180°≤d<225° | 225°≤d<270° | 270°≤d<315° | 315°≤d<360° |
|---|---|---|---|---|---|---|---|---|
| NEXT BEAM TO BE SELECTED | D | C | C | B | B | — | — | D |

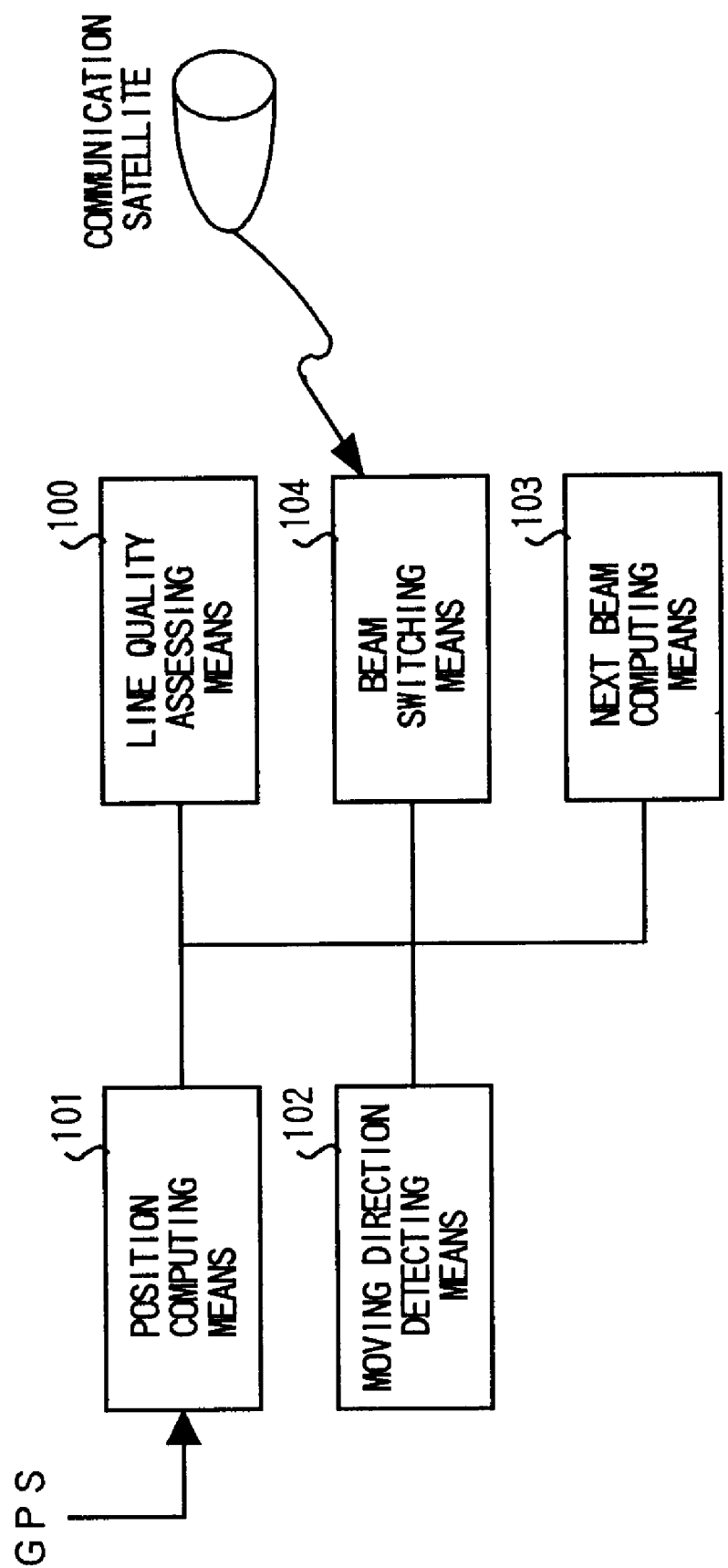

BEAM AUTOMATIC SELECTION SWITCHING METHOD IN MULTI-BEAM SATELLITE COMMUNICATION SYSTEM AND APPARATUS FOR SAME

FIELD OF THE INVENTION

The present invention relates to a mobile satellite communication terminal in a multi-beam satellite communication system, and more particularly to a beam automatic selection switching method for automatically selecting a beam used in the mobile satellite communication terminal as well as to an apparatus for the same.

BACKGROUND OF THE INVENTION

There has been known a technology disclosed in Japanese Patent Laid-Open Publication No. 75518/1993 as a beam automatic selection switching method in a multi-beam satellite communication system. This beam automatic selection switching method, as shown in FIG. 6, comprises a line quality assessing means 100 for assessing a line quality of a signal received from the communication satellite in the mobile satellite communication terminal; a position computing means 101 for computing a current position of the mobile satellite communication terminal according to data received from a GPS; a moving direction detecting means 102 for detecting a moving direction (progressing direction) of the mobile satellite communication terminal by using an earth magnetic sensor or the like; a next beam computing means 103 for computing a beam to be selected next according to a current position of the mobile satellite communication terminal computed by the position computing means 101 as well as to a moving direction of the mobile satellite communication terminal detected by the moving direction detecting means 102; and a beam switching means 104 for transmitting a beam switching request command via the communication satellite to the earth station for switching the beam.

In this beam automatic selection switching method, when the assessment value of a line quality of the mobile satellite communication terminal is determined as worse than a prespecified threshold value by the line quality assessing means 100, at first the position computing means 101 computes a current position of the mobile satellite communication terminal. Then, a beam to be selected next is computed by the next beam computing means 103 according to the moving direction of the mobile satellite communication terminal detected by the moving direction detecting means 102 as well as the current position of the mobile satellite communication terminal computed by the position computing means 101 for deciding the beam, and the beam switching means 104 transmits a beam switching request command to the communication satellite.

Configuration of the beam switching apparatus based on the conventional technology is as described above, so that a long period of time is required for switching a beam, and communications may be cut during the processing described above, and for this reason it is quite inconvenient to use the apparatus.

SUMMARY OF THE INVENTION

It is an object of the present invention to obtain a beam automatic selection switching method in a multi-beam satellite communication system in which an easy-to-use mobile satellite communication terminal can be obtained by reducing a time required for switching beams as well as to obtain an apparatus for the same.

In the beam automatic selection switching method according to the present invention, a beam to be used can be selected by referring to the position-beam correspondence data table previously stored at some point of time when the mobile satellite communication terminal is not executing communications.

In the beam automatic selection switching method according to the present invention, a moving direction-beam correspondence data table is generated by the moving direction-beam correspondence data table generating means at an appropriate point of time when the mobile satellite communication terminal is not executing communications, and a next beam is selected with reference to the moving direction-beam correspondence data table when an assessment value for a line quality becomes worse, so that a beam can be switched within a short period of time even during communications while the communication terminal is moving.

In the beam automatic selection switching method according to the present invention, a beam to be used can be selected by referring to the position-beam correspondence data table previously stored at an appropriate point of time when the mobile satellite communication terminal is not executing communications, so that the beam can be successively be corrected to an accurate beam, and a moving direction-beam correspondence data table is generated by the moving direction-beam correspondence data table generating means at some point of time when the mobile satellite communication terminal is not executing communications, and a next beam is selected with reference to the moving direction-beam data correspondence table when an assessment value for a line quality becomes worse, and for this reason a beam can be switched within a short period of time even during communications while the communication terminal is moving.

In the beam automatic selection switching method according to the present invention, data for the moving direction-beam correspondence data table is generated in the earth station, and this data is written via the communication satellite into the moving direction-beam correspondence data table therefrom.

In the beam automatic selection switching apparatus according to the present invention, a beam to be used is selected by referring to the position-beam correspondence data table previously stored at an appropriate point of time when the mobile satellite communication terminal is not executing communications.

In the beam automatic selection switching apparatus according to the present invention, a moving direction-beam correspondence data table is generated by the moving direction-beam correspondence data table generating means at an appropriate point of time when the mobile satellite communication terminal is not executing communications, and a next beam is selected with reference to the moving direction-beam correspondence data table when the assessment value for a line quality becomes worse. With this feature a beam can be switched within a short period of time even during communications while the communication terminal is moving.

In the beam automatic selection switching apparatus according to the present invention, a beam to be used is selected by referring to the position-beam correspondence data table previously stored at an appropriate point of time when the mobile satellite communication terminal is not executing communications; a moving direction-beam correspondence data table is generated by the moving direction-beam correspondence data table generating means at an appropriate point of time when the mobile satellite communication terminal is not executing communications, and a next beam is selected with reference to the moving direction-beam correspondence data table when the assessment value for a line quality becomes worse. With this feature, a beam can be switched within a short period of time even during communications while the communication terminal is moving.

In the beam automatic selection switching apparatus according to the present invention, a moving direction of the mobile satellite communication terminal can accurately be detected by a special purpose device such as an earth magnetic sensor or a gyroscope.

In the beam automatic selection switching apparatus according to the present invention, a moving direction of the mobile satellite communication terminal can be detected from position data for two points obtained by the position computing means without requiring a dedicated device.

In the beam automatic selection switching apparatus according to the present invention, a line quality of a signal received from the satellite can be assessed according to a bit error rate or a receiving level, or a C/N ratio.

Other objects and features of this invention will become understood from the following description with reference to the accompanying drawings.

BRIEF DESCRIPTION OF THE DRAWINGS

FIG. 4 is an explanatory view showing an example of contents of a moving direction-beam correspondence data table used in the beam automatic selection switching apparatus in the multi-beam satellite communication system according to the present invention;

FIG. 6 is a block diagram showing a beam automatic selection switching apparatus based on the conventional technology.

DESCRIPTION OF THE PREFERRED EMBODIMENTS

Detailed description is made hereinafter for embodiments of the present invention with reference to the related drawings.

Figure 1:
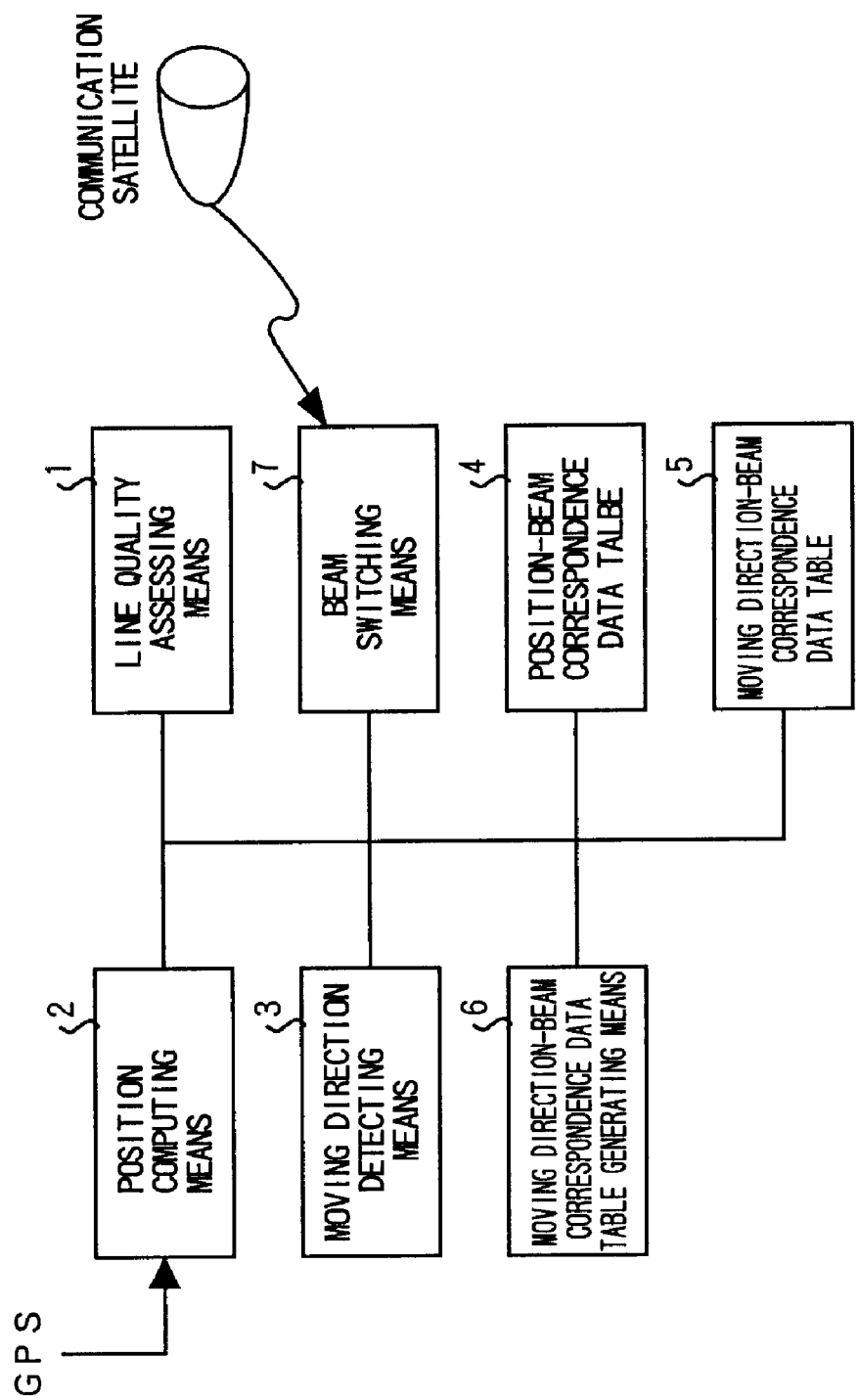
FIG. 1 is a block diagram showing an embodiment of a beam automatic selection switching apparatus in a multi-beam satellite communication system according to the present invention.

FIG. 1 shows an embodiment of the beam automatic selection switching apparatus according to the present invention.

This beam automatic selection switching apparatus comprises a line quality assessing means 1 for assessing a line quality of a signal received from the communication satellite; a position computing means 2 for computing a current position of the mobile satellite communication terminal according to data from GPS or the like; a moving direction detecting means 3 for detecting a moving direction of the mobile satellite communication terminal by an earth magnetic sensor or a gyroscope or the like; a position-beam correspondence data table 4; a moving direction-beam correspondence data table 5; a moving direction-beam correspondence data table generating means 6 for generating the moving direction-beam correspondence data table 5; and a beam switching means 7 for transmitting a beam switching request command to the communication satellite for switching a beam.

Figures 2, 3:
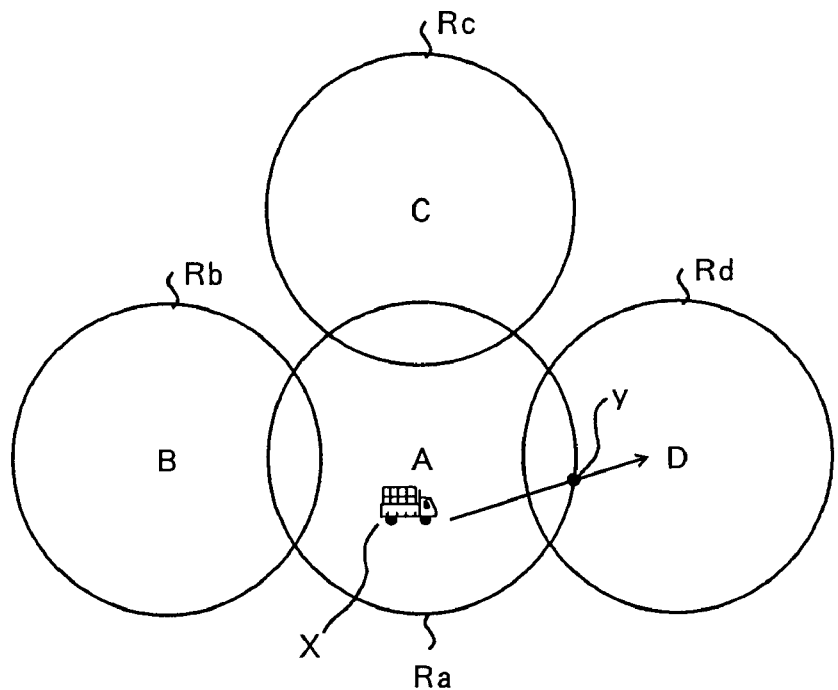
FIG. 2 is an explanatory view showing each beam and areas covered thereby in the multi-beam satellite communication system according to the present invention.
FIG. 3 is an explanatory view showing an example of contents of a position-beam correspondence data table used in the beam automatic selection switching apparatus in the multi-beam satellite communication system according to the present invention.

FIG. 2 shows a plurality of beams A, B, C, D each from the communication satellite in the multi-beam satellite communication system, and each of areas Ra, Rb, Rc, Rd covered by each of these beams, and the reference character X therein indicates a mobile unit mounting thereon a mobile satellite communication terminal.

The position-beam correspondence data table 4 is a data table in which each of a plurality of areas on the ground is correlated to a beam from the communication satellite covering the area, and this data table is previously prepared and written into a memory such as a ROM. The position-beam correspondence data table 4, as shown in FIG. 3, is a data table having a rectangular cell array format, each cell obtained by dividing an area on the ground into a plurality of zones; any of beams A, B. C, and D is written in each cell; and non mark (–) is written in a cell not covered by any beams.

Figure 5:
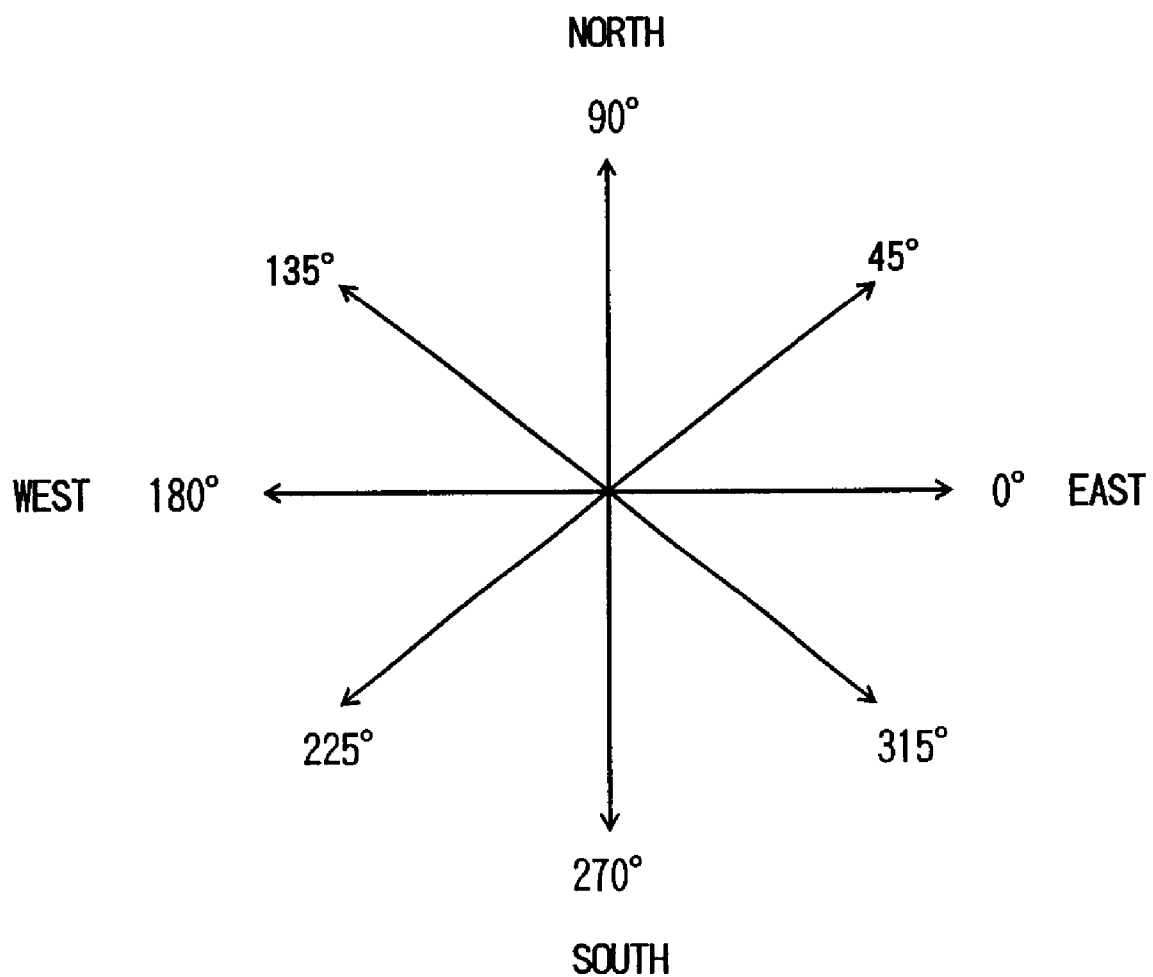
FIG. 5 is an explanatory view showing azimuth angles.

The position-beam correspondence data table 5, as shown in FIG. 5, is a data table in which each of the azimuth N, S, E, W are divided into a plurality of angular areas, for instance, into 8 areas by 45 degrees under the condition that each azimuth is expressed with an angle (Azimuth angle) in the counterclockwise direction assuming that the east is at zero degree, and a beam corresponding to each of the areas is correlated to the each of the angular areas by referring to the current position as a reference point, and this data table is prepared by the position-beam correspondence data table generating means 6.

The position-beam correspondence data table generating means 6 selects a beam to be selected next for each of the moving directions with reference to the data for the position-beam correspondence data table 4 by referring the current position computed by the position computing means 2 as a reference position at an appropriate point of time when the mobile satellite communication terminal is not executing communications such as when a power for the mobile satellite communication terminal is turned ON or when a prespecified key is pressed down, and writes a name of the selected beam into the moving direction-beam correspondence data table 5.

For instance, it is assumed herein that the mobile unit X mounting thereon the mobile satellite communication terminal shown in FIG. 2 is positioned at the area Ra. At first herein, at a point of time when a power for the mobile satellite communication terminal is turned ON, or when a prespecified key is pressed down, at that point of time, in other words, at an appropriate point of time when the mobile satellite communication terminal is not executing communications, the position computing means 2 computes a current position (latitude, longitude) of the mobile satellite communication terminal according to data from the GPS.

The beam switching means 7 searches, when a current position of the mobile satellite communication terminal is computed at the timing as described above, a corresponding cell of the position-beam correspondence data table 4 by referring to the computed current position (latitude, longitude) as a searching key, decides a beam to be used in the area including the current position by reading the data for the corresponding cell from the data table 4, and transmits a beam switching request command for switching to this beam to be used to the communication satellite. With this feature, the beam to be used is initialized.

This process is an initialized process required for switching to a beam corresponding to an area to which the terminal is moved in a case where, for instance, a power for the mobile satellite communication terminal is not turned ON, or the terminal is moved to another area.

However, in a case where the same beam as that already registered in the mobile satellite communication terminal is selected, the beam switching means 7 executes nothing. In only the case where a beam different from that already registered in the mobile satellite communication terminal is selected, the beam switching means 7 transmits a beam switching request command to the communication satellite.

As described above, the beam is selected by referring to the previously stored position-beam correspondence data table 4 at an appropriate point of time when the mobile satellite communication terminal is not executing communications, so that the beam can be corrected to an accurate one.

Also the beam switching means 7 searches a corresponding cell in the moving direction-beam correspondence data table 5 by referring to the moving direction detected by the moving direction detecting means 3 as a searching key when the assessment value of a line quality indicated by a bit error rate, a received level, or a C/N ratio or the like is detected as not more than the prespecified threshold value by the line quality assessing means 1 during movement of the mobile satellite communication terminal, reads out data for the cell from the data table 5 for deciding a beam to be selected next, and transmits a beam switching request command to the communication satellite. With this feature, a beam is switched to an appropriate one.

For instance, in a case where the mobile unit X shown in FIG. 2 moves from the area Ra to another area Rb adjacent thereto, the assessment value of the line quality becomes not more than a specified threshold value near the point y.

The moving direction of the mobile unit X in this step is about 10°, so that the beam switching means 7 selects a next beam D by referring to the mobile direction-beam correspondence data table 5, and the beams is switched by sending a beam switching request command to the communication satellite.

As described above, a moving direction-beam correspondence data table 5 is generated by the moving direction-beam correspondence data table generating means 6 at an appropriate point of time when the mobile satellite communication terminal is not executing communication, and a next beam is selected and set with reference to the moving direction-beam data table 5 when the assessment value of a line quality becomes worse, so that a beam can be switched in a short period of time during communications while the communication terminal is moving, which makes it possible to hardly stop the communications.

It should be noted that in the embodiment described above, the moving direction-beam correspondence data table 5 is generated by the moving direction-beam correspondence data table generating means 6 provided in the mobile satellite communication terminal, but in addition to the system, data for a current position is sent from the mobile satellite communication terminal to an earth station via the communication satellite, the sent data is computed in the earth station for generation, and the result may be informed to the mobile satellite communication terminal via the communication satellite. In this case, the moving direction-beam correspondence data table generating means 6 in the mobile satellite communication terminal becomes unnecessary.

As for detection of a moving direction of the mobile unit X by the moving direction detecting means 3, position data (longitude, latitude) of the mobile unit X for two different points passed through the last time is obtained by using the GPS in addition to a special purpose device such as an earth magnetic sensor or a gyroscope, the moving direction may be detected by the moving direction vector obtained from the difference of a longitude and a latitude between these two points. In this case, a special purpose device for obtaining a moving direction is not required, which makes it possible to reduce the costs of the system.

It should be noted that different two points which are both ends of the vector of a moving direction can be obtained by the position computing means 2 by successively obtaining position data from GPS at a first point of time when communication is not executed after the terminal has passed a prespecified running distance or running time, and the moving direction vector can also be obtained at the point of time.

As understood from the above description, in the beam automatic selection switching method in the multi-beam satellite communication system according to the present invention, a beam to be used can be selected by referring to the previously stored position-beam correspondence data table at an appropriate point of time when the mobile satellite communication terminal is not executing communications, so that the beam can successively be corrected to an accurate beam.

In the beam automatic selection switching method in the multi-beam satellite communication system according to another feature of the present invention, a moving direction-beam correspondence data table is generated by the moving direction-beam correspondence data table generating means at an appropriate point of time when the mobile satellite communication terminal is not executing communications, and a next beam is selected with reference to the moving direction-beam correspondence data table when the assessment value of a line quality becomes worse, so that a beam can be switched in a short period of time even during communications while the terminal is moving, which makes it possible to hardly cut communications.

In the beam automatic selection switching method in the multi-beam satellite communication system according to another feature of the present invention, a beam to be used can be selected by referring to the previously stored position-beam correspondence data table at an appropriate point of time when the mobile satellite communication terminal is not executing communications, so that the beam can successively be corrected to an accurate beam, and also a moving direction-beam correspondence data table is generated by the moving direction-beam correspondence data table generating means at an appropriate point of time when the mobile satellite communication terminal is not executing communications; and a next beam is selected with reference to the moving direction-beam correspondence data table when the assessment value of a line quality becomes worse, so that a beam can be switched in a short period of time even during communications while the terminal is moving, which makes it possible to hardly cut communications.

In the beam automatic selection switching method in the multi-beam satellite communication system according to another feature of the present invention, data for a moving direction-beam correspondence data table is generated in the earth station, and the data is written via the satellite into the moving direction-beam correspondence data table therefrom, so that a moving direction-beam correspondence data table generating means in the mobile satellite communication terminal can be omitted.

In the beam automatic selection switching apparatus in the multi-beam satellite communication system according to another feature of the present invention, a beam to be used can be selected by referring to the previously stored position-beam correspondence data table at an appropriate point of time when the mobile satellite communication terminal is not executing communications, so that the beam can successively be corrected to an accurate beam.

In the beam automatic selection switching apparatus in the multi-beam satellite communication system according to another feature of the present invention, a moving direction-beam correspondence data table is generated by the moving direction-beam correspondence data table generating means at an appropriate point of time when the mobile satellite communication terminal is not executing communications, and a next beam is selected with reference to the moving direction-beam correspondence data table when the assessment value of a line quality becomes worse, so that the beam can be switched in a short period of time even during communications while the terminal is moving, which makes it possible to hardly cut communications.

In the beam automatic selection switching apparatus in the multi-beam satellite communication system according to another feature of the present invention, a beam to be used can be selected by referring to the previously stored position-beam correspondence data table at an appropriate point of time when the mobile satellite communication terminal is not executing communications, so that the beam can successively be corrected to an accurate beam, and also a moving direction-beam correspondence data table is generated by the moving direction-beam correspondence data table generating means at some point of time when the mobile satellite communication terminal is not executing communications; and a next beam is selected with reference to the moving direction-beam correspondence data table when the assessment value of a line quality becomes worse, so that the beam can be switched in a short period of time even during communications while the terminal is moving, which makes it possible to hardly cut communications.

In the beam automatic selection switching apparatus in the multi-beam satellite communication system according to another feature of the present invention, a moving direction of the mobile satellite communication terminal can accurately be detected by a special purpose device such as an earth magnetic sensor or a gyroscope without requiring for any complicated computation.

In the beam automatic selection switching apparatus in the multi-beam satellite communication system according to another feature of the present invention, a moving direction of the mobile satellite communication terminal can be detected from position data for two points obtained by the position computing means, so that a moving direction can be detected without any special device, which makes it possible to reduce the costs thereof.

In the beam automatic selection switching apparatus in the multi-beam satellite communication system according to another feature of the present invention, a line quality of a signal received from the satellite is assessed according to a bit error rate or a receiving level, or a C/N ratio, so that assessment of a line quality can accurately be made.

This application is based on Japanese patent application No. HEI 8-20304 filed in the Japanese Patent Office on Feb. 6, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An automatic beam switching method in a multi-beam satellite communication system comprising the steps of:
   storing a plurality of ground positions of a plurality of beams of said multi-beam satellite communication system in a position-beam correspondence table;
   computing a first position of a mobile satellite communication terminal;
   selecting a first beam of said plurality of beams by referencing said position-beam correspondence table, utilizing said first position of said mobile satellite communication terminal as an index into said position-beam correspondence table; and
   transmitting a first beam switching request to said multi-beam satellite communication system for switching to said selected first beam.

2. An automatic beam switching method in a multi-beam satellite communication system, comprising the steps of:
   storing a plurality of ground positions of a plurality of beams of said multi-beam satellite communication system in a position-beam correspondence table;
   computing a first position of a mobile satellite communication terminal;
   selecting a first beam by referencing said position-beam correspondence table, utilizing said first position of said mobile satellite communication terminal as an index into said position-beam correspondence table;
   transmitting a first beam switching request to said multi-beam satellite communication system to switch said communication system to said selected beam;
   storing a plurality of angular directions corresponding to a plurality of adjacent beams in a direction-beam correspondence table;
   assessing a signal quality of a signal received from said multi-beam satellite communication system;
   selecting a second beam by referencing said direction-beam correspondence table when said signal quality does not exceed a predetermined threshold; and
   transmitting a second beam switching request to said multi-beam satellite communication system for switching to said second beam when said second beam has been selected.

3. An automatic beam switching method in a multi-beam satellite communication system according to claim 2 wherein the step of storing a plurality of angular directions corresponding to a plurality of adjacent beams in a direction-beam correspondence table further comprises:
   transmitting a current position of said mobile satellite communication terminal from said multi-beam satellite communication system to an earth station;
   generating said plurality of angular directions corresponding to said plurality of adjacent beams;

transmitting said plurality of angular directions from said earth station to said multi-beam satellite communication system: and transmitting said plurality of angular directions from said multi-beam satellite communication system to said mobile satellite communication terminal.

4. An automatic beam switching method in a multi-beam satellite communication system, comprising the steps of:

storing a plurality of ground positions of a plurality of beams of said multi-beam satellite communication system in a position-beam correspondence table;

computing a first position of a mobile satellite communication terminal;

selecting a first beam by referencing said position-beam correspondence table, utilizing said first position of said mobile satellite communication terminal as an index into said position-beam correspondence table;

transmitting a first beam switching request to said multi-beam satellite communication system to switch said communication system to said selected beam;

storing a plurality of angular directions corresponding to a plurality of adjacent beams in a direction-beam correspondence table;

assessing a signal quality of a signal received from said multi-beam satellite communication system:

selecting a second beam by referencing said direction-beam correspondence table when said signal quality does not exceed a predetermined threshold; and transmitting a second beam switching request to said multi-beam satellite communication system for switching said communication system to said second beam when said second beam has been selected.

5. An automatic beam switching method in a multi-beam satellite communication system according to claim 4 wherein the step of storing a plurality of angular directions corresponding to a plurality of adjacent beams in a direction-beam correspondence table further comprises:

transmitting a current position of said mobile satellite communication terminal from a multi-beam satellite to an earth station;

generating said plurality of angular directions corresponding to said Plurality of adjacent beams;

transmitting said plurality of angular directions from said earth station to said multi-beam satellite communication system; and transmitting said plurality of angular directions from said multi-beam satellite communication system to said mobile satellite communication terminal.

6. An automatic beam switching apparatus in a multi-beam satellite communication system comprising:

a position computing means for computing a first position of a mobile satellite communication terminal;

a position-beam correspondence table having a plurality of stored positions that correspond to a plurality of adjacent beams; and a beam switching means for selecting a first beam by referencing said position-beam correspondence table using said computed first position of said mobile satellite communication terminal.

7. An automatic beam switching apparatus in a multi-beam satellite communication system comprising:

position computing means for computing a current position of a mobile satellite communication terminal;

direction detection means for detecting a direction of movement of said mobile satellite communication terminal;

a position-beam correspondence table having a plurality of stored positions that correspond to a plurality of adjacent beams;

means for selecting a first beam from said position-beam correspondence table using said computed current position of said mobile satellite communication terminal;

a direction-beam correspondence table having a plurality of stored angular directions that correspond to a plurality of adjacent beams;

a direction-beam correspondence table generating means for generating said direction-beam correspondence table;

a signal quality assessing means for assessing a signal quality of a signal received from said multi-beam satellite communication system using said selected first beam; and a beam switching means for selecting a second beam by referencing said direction-beam correspondence table when said signal quality does not exceed a predetermined threshold.

8. An automatic beam switching apparatus in a multi-beam satellite communication system according to claim 7, wherein said direction detecting means is a dedicated device.

9. An automatic beam switching apparatus in a multi-beam satellite communication system according to claim 7, wherein said direction detecting means computes a direction of movement from a pair of points computed by said position computing means.

10. An automatic beam switching apparatus in a multi-beam satellite communication system according to claim 7, wherein said signal quality assessing means assesses said signal quality from a bit error rate.

11. An automatic beam switching apparatus in a multi-beam satellite communication system comprising:

position computing means for computing a current position of a mobile satellite communication terminal;

direction detection means for detecting a direction of movement of said mobile satellite communication terminal;

a position-beam correspondence table having a plurality of stored positions that correspond to a plurality of adjacent beams;

a direction-beam correspondence table having a plurality of stored angular directions that correspond to a plurality of adjacent beams;

a direction-beam correspondence table generating means for generating said direction-beam correspondence table;

a signal quality assessing means for assessing a signal quality of a signal received from said multi-beam satellite communication system; and beam switching means for selecting a first beam by referencing said position-beam correspondence table, and for selecting a second beam by referencing said direction-beam correspondence table when said signal quality does not exceed a predetermined threshold.

12. An automatic beam switching apparatus in a multi-beam satellite communication system according to claim 11, wherein said direction detecting means is a dedicated device.

13. An automatic beam switching apparatus in a multi-beam satellite communication system according to claim 11, wherein said direction detecting means computes a direction of movement from a pair of points computed by said position computing means.

14. An automatic beam switching apparatus in a multi-beam satellite communication system according to claim 11, wherein said signal quality assessing means assesses said signal quality from a bit error rate.

15. An automatic beam switching apparatus in a multi-beam satellite communication system according to claim 7, wherein said direction detecting means is an earth magnetism sensor.

16. An automatic beam switching apparatus in a multi-beam satellite communication system according to claim 7, wherein said direction detecting means is a gyroscope.

17. An automatic beam switching apparatus in a multi-beam satellite communication system according to claim 7, wherein said signal quality assessing means assesses said signal quality from a receiving level.

18. An automatic beam switching apparatus in a multi-beam satellite communication system according to claim 7, wherein said signal quality assessing means assesses said signal quality from a C/N ratio.

19. An automatic beam switching apparatus in a multi-beam satellite communication system according to claim 11, wherein said direction detecting means is an earth magnetism sensor.

20. An automatic beam switching apparatus in a multi-beam satellite communication system according to claim 11, wherein said direction detecting means is a gyroscope.

* * * * *

UNITED STATES PATENT AND TRADEMARK OFFICE
CERTIFICATE OF CORRECTION

PATENT NO.   : 6,421,526 B1
DATED        : July 16, 2002
INVENTOR(S)  : Kozo Banno It is certified that error appears in the above-identified patent and that said Letters Patent is hereby corrected as shown below:

<u>Column 4,</u>
Line 26, "A, B. C," should be -- A, B, C, --.

<u>Column 9,</u>
Line 42, "Plurality" should be -- plurality --.

Signed and Sealed this

Eighteenth Day of March, 2003

JAMES E. ROGAN
*Director of the United States Patent and Trademark Office*